United States Patent
Haller

(10) Patent No.: US 9,758,078 B2
(45) Date of Patent: Sep. 12, 2017

(54) VEHICLE SEAT OR VEHICLE CAB WITH A SUSPENSION SYSTEM, AND UTILITY VEHICLE

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/915,375

(22) PCT Filed: Sep. 24, 2014

(86) PCT No.: PCT/EP2014/070313
§ 371 (c)(1),
(2) Date: Feb. 29, 2016

(87) PCT Pub. No.: WO2015/049134
PCT Pub. Date: Apr. 9, 2015

(65) Prior Publication Data
US 2016/0207430 A1    Jul. 21, 2016

(30) Foreign Application Priority Data
Oct. 1, 2013   (DE) .......................... 10 2013 110 927

(51) Int. Cl.
*F16M 13/00*    (2006.01)
*B60N 2/50*    (2006.01)
(Continued)

(52) U.S. Cl.
CPC ............. *B60N 2/505* (2013.01); *B60G 17/08* (2013.01); *B60G 99/002* (2013.01);
(Continued)

(58) Field of Classification Search
USPC ........................................................ 248/550
See application file for complete search history.

(56) References Cited

U.S. PATENT DOCUMENTS

| 5,169,112 A | * | 12/1992 | Boyles | ................... B60N 2/501 |
| | | | | 248/406.2 |
| 5,735,509 A | * | 4/1998 | Gryp | ..................... B60N 2/501 |
| | | | | 248/550 |

(Continued)

FOREIGN PATENT DOCUMENTS

| DE | 10 2008 027 175 A1 | 1/2009 |
| DE | 20 2011 005 606 U1 | 12/2011 |

(Continued)

OTHER PUBLICATIONS

International Search Report prepared by the European Patent Office dated Nov. 26, 2014, for International Application No. PCT/EP2014/070313.

(Continued)

*Primary Examiner* — Monica Millner
(74) *Attorney, Agent, or Firm* — Sheridan Ross PC

(57) ABSTRACT

The invention relates to a vehicle seat or a vehicle cab with a suspension system comprising an upper closing part and a lower closing part which is deflectable in relation to the upper closing part, which closing parts are operatively connected to each other in a resilient manner by means of a suspension element, and with a damping system for damping vibrations acting on at least one of the two closing parts, wherein an electromagnetically acting damping and height-levelling unit is provided which is arranged between the two closing parts in such a manner that said damping and height-levelling unit acts on the upper of the two closing parts in the vertical direction of the vehicle both in a vibration-insulating and also height-levelling manner.

17 Claims, 3 Drawing Sheets

(51) Int. Cl.
  *F16F 15/03* (2006.01)
  *B60G 17/08* (2006.01)
  *B60G 99/00* (2010.01)
  *B60N 2/02* (2006.01)
  *B60N 2/16* (2006.01)
  *B62D 33/06* (2006.01)
  *B62D 33/063* (2006.01)

(52) U.S. Cl.
  CPC ......... *B60N 2/0232* (2013.01); *B60N 2/1675* (2013.01); *B60N 2/501* (2013.01); *B60N 2/502* (2013.01); *B60N 2/508* (2013.01); *B62D 33/063* (2013.01); *B62D 33/0604* (2013.01); *F16F 15/03* (2013.01); *B60G 2202/24* (2013.01); *B60G 2202/416* (2013.01); *B60G 2202/42* (2013.01); *B60G 2500/11* (2013.01)

(56) References Cited

U.S. PATENT DOCUMENTS

| | | | | |
|---|---|---|---|---|
| 5,975,508 | A * | 11/1999 | Beard | B60N 2/501 180/89.12 |
| 6,120,082 | A * | 9/2000 | Vandermolen | B60N 2/02 248/550 |
| 6,186,467 | B1 * | 2/2001 | Wahls | B60N 2/502 248/157 |
| 6,371,456 | B1 * | 4/2002 | Ritchie | B60N 2/501 248/550 |
| 7,568,675 | B2 * | 8/2009 | Catton | B60N 2/502 248/421 |
| 7,770,974 | B2 * | 8/2010 | Ott | B60N 2/501 297/344.15 |
| 7,887,033 | B2 * | 2/2011 | Shoemaker | B60N 2/501 267/136 |
| 8,622,362 | B2 * | 1/2014 | Keen | B60N 2/501 248/421 |
| 2004/0144906 | A1 * | 7/2004 | Hill | B60N 2/502 248/421 |
| 2005/0110243 | A1 * | 5/2005 | Meier | B60N 2/002 280/727 |
| 2007/0278025 | A1 * | 12/2007 | Shoemaker | B60N 2/501 180/89.13 |
| 2008/0088165 | A1 * | 4/2008 | Deml | B60N 2/501 297/344.12 |
| 2009/0134557 | A1 * | 5/2009 | Spangler | B60N 2/38 267/131 |
| 2009/0198419 | A1 * | 8/2009 | Clark | B60N 2/501 701/49 |
| 2009/0272871 | A1 * | 11/2009 | Haller | B60N 2/501 248/631 |
| 2010/0117428 | A1 * | 5/2010 | Deml | B60N 2/502 297/344.15 |
| 2010/0133413 | A1 * | 6/2010 | Wahls | B60N 2/502 248/566 |
| 2011/0024958 | A1 * | 2/2011 | Deml | B60N 2/502 267/131 |
| 2011/0298266 | A1 * | 12/2011 | Haller | B60N 2/525 297/344.12 |

FOREIGN PATENT DOCUMENTS

| | | |
|---|---|---|
| EP | 1 702 791 A2 | 9/2006 |
| EP | 2 390 133 A1 | 11/2011 |
| JP | 2003 1391932 A | 5/2003 |
| WO | WO 2010/136049 A1 | 12/2010 |

OTHER PUBLICATIONS

German Search Report dated Jul. 23, 2014, for German Application No. 10 2013 110 927.6.

* cited by examiner

VEHICLE SEAT OR VEHICLE CAB WITH A SUSPENSION SYSTEM, AND UTILITY VEHICLE

CROSS REFERENCE TO RELATED APPLICATIONS

This application is a national stage application under 35 U.S.C. 371 and claims the benefit of PCT Application No. PCT/EP2014/070313 having an international filing date of 24 Sep. 2014, which designated the United States, which PCT application claimed the benefit of German Patent Application No. 10 2013 110 927.6 filed 1 Oct. 2013, the disclosures of each of which are incorporated herein by reference in their entirety.

FIELD

The invention relates to a vehicle seat or a vehicle cab, having a suspension device comprising an upper end part and a lower end part that is deflectable relative to the upper end part, which parts are resiliently operatively interconnected by means of a suspension element, and having a damping device for damping vibrations acting on at least one of the two end parts.

Furthermore, the invention relates to a utility motor vehicle having a vehicle seat and having a vehicle cab.

BACKGROUND

Generic vehicle seats or vehicle cabs which can considerably improve the ride comfort in particular of utility motor vehicles are well known from the prior art.

SUMMARY

The object of the present invention is to support generic vehicle seats or vehicle cabs respectively in a structurally simpler manner relative to a vehicle body while providing improved ride comfort.

The object of the invention is solved by a vehicle seat or a vehicle cab having the features set out in claim 1.

The invention is based on the generic prior art in that an electromagnetically acting damping and height-adjusting unit is provided which is arranged between the two end parts such that it acts on the upper of the two end parts in the vertical direction of the vehicle in both a vibration-isolating manner and a height-regulating manner.

As a result of this electromagnetically acting damping and height-adjusting unit, a damping device for a suspension system together with a height adjustment and thus the entire substructure of the vehicle seat or the vehicle cab respectively can be implemented in an extremely structurally simple manner, in order to bring about corresponding vibration isolation and/or height adjustment exclusively or in an auxiliary manner.

In particular, the electromagnetically acting damping and height-adjusting unit can be actively involved in vibration isolation. This means that for example damping by the present damping device, which is generated by conventional damping elements, such as hydraulic shock absorbers or the like, can be cumulatively or alternatively actively modulated.

Furthermore, adjustment forces acting in the vertical direction of the vehicle can be generated in a structurally simple manner, as is explained in the following in greater detail, still by way of example.

In addition, this electromagnetically acting damping and height-adjusting unit can produce a linearly rising force characteristic curve or spring characteristic curve respectively over the entirety of the available suspension travel.

The above-mentioned improvements can be advantageously achieved since a torque acting in the vertical direction of the vehicle can be generated by the electromagnetically acting damping and height-adjusting unit.

The object of the invention is furthermore solved by a utility motor vehicle having the features set out in claim 12.

The vehicle seat according to the invention or the vehicle cab according to the invention respectively can be advantageously used in particular in conjunction with utility motor vehicles, since the vehicle driver is better protected against premature fatigue owing to the considerably improved ride comfort. Furthermore, in terms of utility motor vehicles, there is also great interest in solutions for corresponding suspension systems that are structurally simple and thus less susceptible to faults. This also applies in particular to agricultural utility motor vehicles.

The suspension device may comprise one or more suspension elements, which may for example be designed as a mechanical suspension element and/or as a pneumatic suspension element.

The upper end part of the suspension device may for example be attached to the underside of a seat part of the vehicle seat or to the underside of the vehicle cab, or may be formed directly from this respective underside.

In this respect, the lower end part of the suspension device may for example be fastened to a component of a vehicle body or may be formed directly by said body.

In any case, the upper end part is mounted on a substructure of the vehicle seat or the vehicle cab respectively relative to the lower end part such that said upper end part can be deflected relative to the lower end part in the vertical deflection direction, i.e. in the vertical direction of a vehicle, in particular a utility motor vehicle, if in particular external vibration excitations act on the vehicle seat or vehicle cab respectively.

In this respect, the upper end part is a component of the suspension device that vibrates substantially vertically, the main vibration direction of which is in the vertical direction of the vehicle, i.e. is vertical.

For this purpose, the suspension device is in particular equipped with a vertical suspension element which can act in the vertical direction of the vehicle in a resilient manner.

A mechanism for deflecting the upper end part relative to the lower end part can be achieved very simply by means of a scissors type frame.

In this respect, it is advantageous for the upper end part and the lower end part to be interconnected by means of a scissors type frame. As a result, the upper end part is guided in the vertical direction in a defined manner.

If, furthermore, the damping device and a height-adjusting device for adjusting a distance between the upper end part and the lower end part in the vertical direction of the vehicle together comprise the electromagnetically acting damping and height-adjusting unit, by means of which a torque acting in the vertical direction of the vehicle can be generated, the structure can be further simplified.

Advantageously, the damping device and the height-adjusting device can be structurally implemented at least by means of a common and ideally single electromagnetically operating actuator element, and therefore these devices can be constructed using much fewer components.

It is clear that the electromagnetically acting damping and height-adjusting unit can be designed in various manners in structural terms, and therefore different structures may of course be used to produce the electromagnetically acting damping and height-adjusting unit.

For example, the electromagnetically acting damping and height-adjusting unit comprises a pole face friction clutch for this purpose.

For example, the electromagnetically acting damping and height-adjusting unit can be particularly simply and cost-effectively provided if the electromagnetically acting damping and height-adjusting unit comprises an eddy current brake.

A preferred variant provides that a rotor of the electromagnetically acting damping and height-adjusting unit comprises a rotational-axis element of two rotationally interconnected scissor arm parts of a scissors type frame coupling the two end parts to one another.

By means of a rotor which is constructed in this manner and integrated in the scissors type frame, both the vibrations of a vehicle seat or vehicle cab respectively are isolated and the height of said seat or cab respectively is adjusted in a structurally simple manner.

The present scissors type frame is characterized by two lateral pairs of scissor arm parts. Each of the two pairs of scissor arm parts are in turn made up of two scissor arm parts, which for example are rotationally interconnected at a pivotal point in the centre of their longitudinal extension. Generally, such a pivotal point is produced by a bearing pin which is supported in corresponding bearing eyes in the two scissor arm parts.

Advantageously, such a conventional bearing pin is replaced by the rotor of the present electromagnetically acting damping and height-adjusting unit, and therefore the rotor forms or drives a corresponding rotational-axis element.

Furthermore, it is advantageous for a drive unit of a rotor of the electromagnetically acting damping and height-adjusting unit to be arranged on a first scissor arm part of a scissors type frame coupling the two end parts to one another and for a stator of the electromagnetically acting damping and height-adjusting unit to be arranged on a second scissor arm part of the scissors type frame.

By means of this structure, the torques generated by the electromagnetically acting damping and height-adjusting unit may produce a translational displacement of the upper end part.

In this respect, the generated torques bring about vertical forces specifically acting on the upper end part which are in particular directed in the vertical direction of the vehicle.

By means of these generated torques, vibration isolation can be cumulatively achieved.

This in turn means that the damping device and the height-adjusting device comprise a common electromagnetically operating actuator element, by means of which on the one hand vibration isolation can be achieved. On the other hand, it is possible to carry out height adjustment by means of this common electromagnetically operating actuator element.

Within the meaning of the invention, the present rotor represents the drive side and the corresponding stator represents the magnet side of the electromagnetically acting damping and height-adjusting unit.

The drive unit may be equipped in a structurally simple manner with an electrically controllable electric motor, which drives the rotor.

In a structurally simple manner, the rotor may be shrunk onto a drive shaft of the electric motor or the like. Other force-locked, interlocking or integrally bonded connections may also be used, however.

Particularly good interaction between the rotor and the stator may be achieved if the rotor has a collar region that protrudes radially relative to the rotational axis of the rotational-axis element and interacts with the stator. Advantageously, the collar region consists at least in part of copper or a disc-shaped copper element, by means of which the ability of the rotor to interact with the stator can be further improved.

Preferably, the stator comprises an electrically controllable electromagnet element or a permanent-magnet element.

Therefore, high-frequency control of the electromagnetically acting damping and height-adjusting unit, which control is required for influencing vibrations, may take place in the case of the electrically controllable electromagnet element by means of a change in the current/voltage values at the electrically controllable electromagnet element.

Alternatively, in the case of the permanent magnet, such influencing of vibrations may also be achieved by axially displacing the rotor along the rotational axis of the rotational-axis element. This means that the distance between the rotor and the stator is increased or decreased.

In this respect, it is advantageous for the rotor to be mounted relative to a stator such it can move axially along the rotational axis of the rotational-axis element.

The type and intensity of the control of the electromagnetically acting damping and height-adjusting unit can, in all variants of the embodiment, be influenced by means of a control algorithm of a corresponding open-loop and/or closed-loop control device.

In this respect, a further advantageous variant of the embodiment provides an open-loop and/or closed-loop control device for adjusting the electromagnetically acting damping and height-adjusting unit depending on a load acting on the upper end part.

The electromagnetically acting damping and height-adjusting unit may operate particularly efficiently if the open-loop and/or closed-loop control device comprises an acceleration-measuring sensor which is arranged on the face of the lower end part and is intended for detecting accelerations acting on the lower end part.

More precise open-loop or closed-loop control of the electromagnetically acting damping and height-adjusting unit can be achieved if the open-loop and/or closed-loop control device comprises a travel-measuring sensor for detecting a distance and/or a distance variation between the upper and the lower end part.

Furthermore, it is advantageous for the electromagnetically acting damping and height-adjusting unit to comprise an element for supplying a power of 12 V or 24 V, or at least an electrical connection for a corresponding power supply.

By means of the present invention, an actively controlled suspension system is provided which additionally has the electromagnetically acting actuator element, which on the one hand can temporarily adjust a set height level, in particular a set height of a vehicle seat. On the other hand, said electromagnetically acting actuator element can be actively involved in isolating vibrations. In this respect, this means that the electromagnetically acting damping and height-adjusting unit is produced to be particularly simple in structure.

Here, a conventional air suspension element or the like may be used as basic suspension, while the electromagnetically acting actuator element can additionally act in the vertical suspension direction as an additional active component or additional active assembly, in particular in the form of an eddy current brake. For this purpose, the electromagnetically acting actuator element is integrated in the suspension device, as already described above, such that a torque generated by the electromagnetically acting actuator element brings about a vertically acting supporting force.

Further advantages of the present invention are therefore considered to be that of it being possible in the present case to achieve contact-free, force-locked interaction of movable components that is produced by pole face friction of magnets. Likewise, almost wear-free operation can be ensured.

The force component, which in this case is initially present as torque, is on the one hand generated by the rotational speed of the electric motor. On the other hand, said speed is changed in milliseconds by a change in distance for the variant having the permanent-magnet element or by current/voltage control for the variant having the electromagnet element.

Here, the rotational speed of the electric motor or the drive unit of the rotor respectively generates the basic force for level control, the change in distance between the rotor and the stator and the current-voltage value respectively acting as the foremost control parameter for influencing the vibration isolation.

BRIEF DESCRIPTION OF THE DRAWINGS

Further advantages, aims and properties of the present invention are explained by way of the accompanying drawings and the following description, which show and describe a utility motor vehicle seat comprising alternatively designed electromagnetically acting damping and height-adjusting units by way of example. In the drawings.

DETAILED DESCRIPTION

Figure 1:
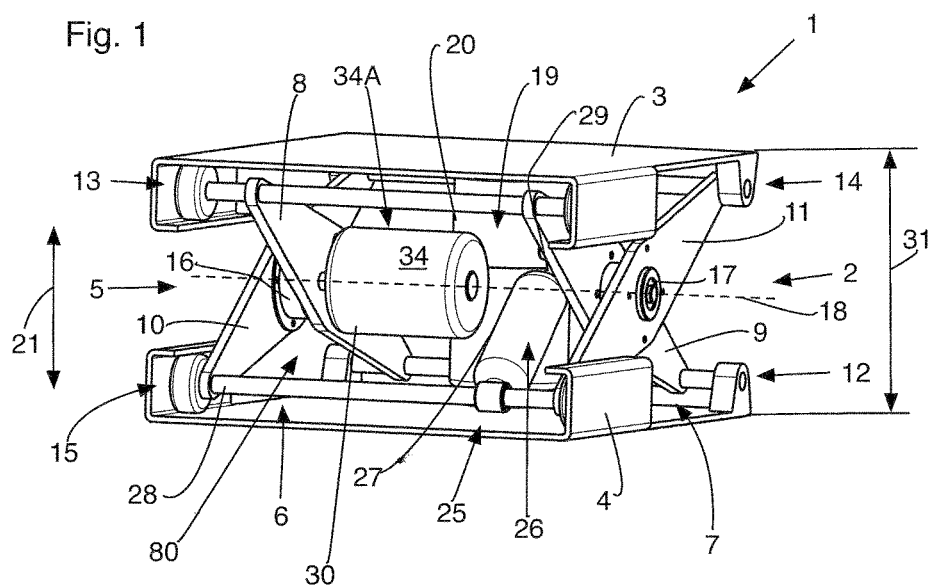
FIG. 1 is a schematic front view of a vehicle seat substructure comprising an electromagnetically acting damping and height-adjusting unit, which is arranged between two end parts of a suspension device such that it acts on one of the two end parts in the vertical direction of the vehicle in both a vibration-isolating manner and a height-adjusting manner, FIG. 2 schematically shows a graph having different spring characteristic curves of the suspension device from FIG. 1.

The vehicle seat substructure 1, shown in particular in FIG. 1, of a vehicle seat (not shown in greater detail) comprises a suspension device 2, which is characterized by an upper end part 3 and a lower end part 4 which, in this embodiment, are both coupled to one another by a scissors type frame 5 in a height-adjustable manner.

The scissors type frame 5 substantially consists of two pairs of scissor arms 6 and 7, which in turn each comprise a first scissor arm 8 and 9 respectively and a second scissor arm 10 and 11 respectively.

The first scissor arms 8 and 9 respectively are on the one hand rotationally mounted on the lower end part 4 by means of a common lower fixed-bearing device 12. On the other hand, they are mounted on the upper end part 3 in a linearly movable manner by means of a common upper movable-bearing device 13.

The second scissor arms 10 and 11 behave similarly, and are rotationally mounted on the upper end part 3 by means of a common upper fixed-bearing device 14 and are mounted on the lower end part 4 in a linearly movable manner by means of a common lower movable-bearing device 15.

The first and second scissor arms 8, 10 and 9, 11 respectively of the pairs of scissor arms 6 and 7 respectively are rotationally interconnected by means of a pivotal point 16 or 17, respectively, such that they can rotate about a rotational axis 18.

Furthermore, the suspension device 2 also comprises a suspension element 18, by means of which the two end parts 3 and 4 are resiliently interconnected. The suspension element 19 is provided by a pneumatic-spring element 20.

When installed, the upper end part 3 is integrated in the vehicle seat on the seat-part side and the lower end part 4 is integrated in the vehicle seat on the vehicle-body side such that the upper end part 3 can rebound and deflect relative to the lower end part 4 in the vertical direction 21 of the vehicle when a corresponding external stimulus acts on the vehicle seat or on the vehicle respectively.

In order for it to be possible to at least partially isolate the vibrations of the upper end part 3, the vehicle seat substructure 1 further comprises a damping device 25 comprising a hydraulic shock absorber element 26.

The hydraulic shock absorber element 26 is attached by its cylinder part 27 to a cross bar 28 of the common lower movable-bearing device 15 and by a piston part 29 to the first scissor arm 9 of the second pair of scissor arms 7.

In order to additionally achieve active vibration isolation and furthermore height adjustment of the upper end part 3 relative to the lower end part 4, the damping device 25 comprises another electromagnetically acting damping and height-adjusting unit 30, which is arranged between the two end parts 3, 4 such that it acts on the upper end part 3 in the vertical direction 21 of the vehicle both in a vibration-isolating manner and in a height-adjusting manner.

In this respect, the electromagnetically acting damping and height-adjusting unit 30 may not only be considered to be an additional functional assembly of the damping device 25, but at the same time is also a height-adjusting device for adjusting a distance 31 between the upper end part 3 and the lower end part 4 in the vertical direction 21 of the vehicle.

As can clearly be seen from the views according to FIGS. 3 to 6, the electromagnetically acting damping and height-adjusting unit 30 is integrated in the suspension system comprising the suspension device 2 in a particularly structurally simple manner, since in some cases it is an integral component of the first pivotal point 16, by a rotor 32 of the electromagnetically acting damping and height-adjusting unit 30 forming a rotational-axis element 33 of the first pivotal point 16, by means of which the two scissor arms 8 and 10 are rotationally interconnected.

In this case, the rotor 32 is driven by means of an electrically controllable electric motor 34, the electrically controllable electric motor 34 being flange-mounted to the first scissor arm 8 of the first pair of scissor arms 6 by its housing 34A.

Furthermore, the electromagnetically acting damping and height-adjusting unit 30 further comprises a stator 35 which is attached to the second scissor arm 10 of the first pair of scissor arms 6 for conjoint rotation.

So that the rotor 32 and the stator 35 can better interact with one another, the rotor 32 also comprises a collar region 37 which is equipped with a copper ring 36 and extends radially outwards from the rotational-axis element 33.

Figure 3:
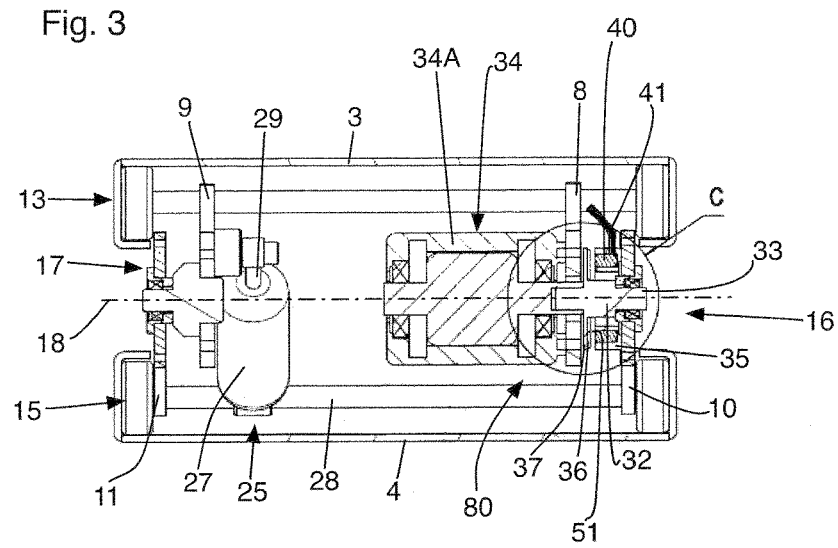
FIG. 3 is a schematic partial section through the suspension device from FIG. 1, comprising an electromagnetically acting damping and height-adjusting unit which comprises an electrically controllable electromagnet element.
Figure 4:
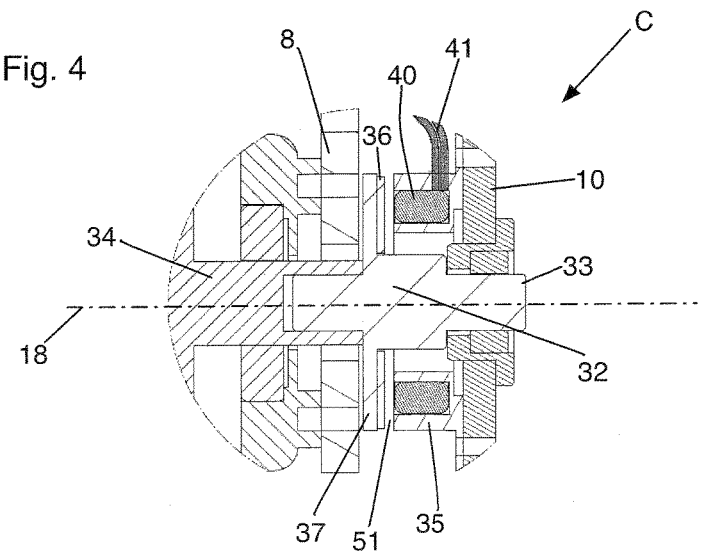
FIG. 4 is a schematic view of a detail of the electromagnetically acting damping and height-adjusting unit from FIG. 3.

According to the embodiment shown in FIGS. 3 and 4, the stator 35 is equipped with an electromagnet 40, which can be controlled in terms of current strength and voltage by means of an electrical connection 41. In this respect, the electromagnetic effect of the electromagnetically acting damping and height-adjusting unit 30 that can be achieved can on the one hand be modulated by the rotational speed of the rotor 32 and on the other hand by the current strength or voltage respectively at the electromagnet 40.

Figure 5:
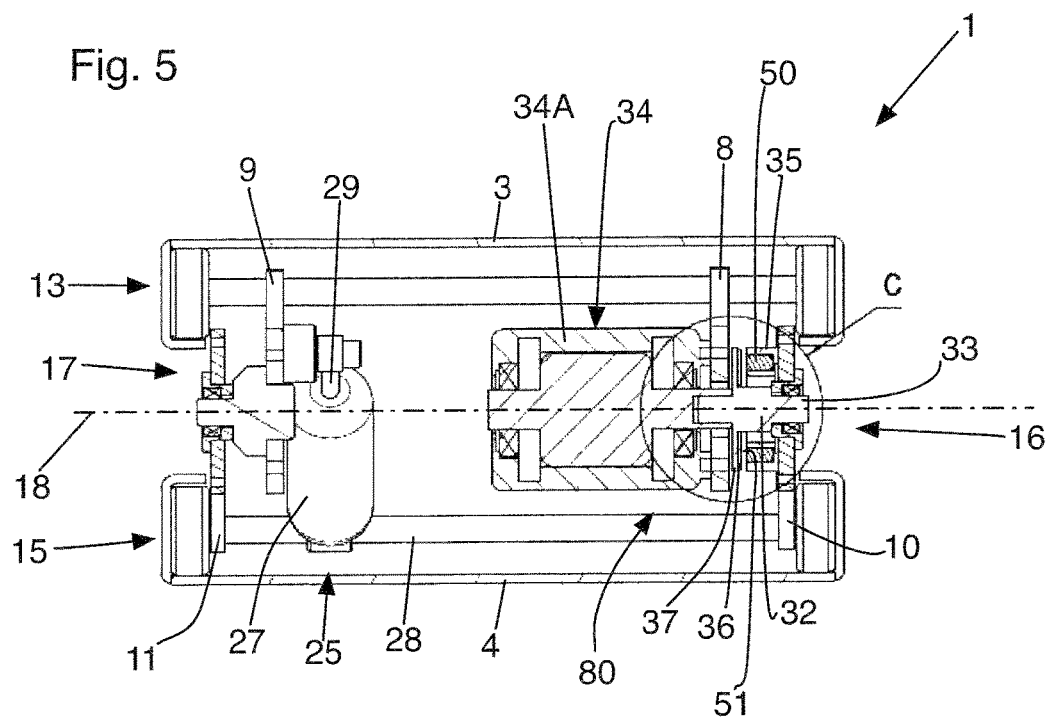
FIG. 5 is a schematic partial section through the suspension device from FIG. 1, comprising an alternative electromagnetically acting damping and height-adjusting unit which comprises a permanent-magnet element.
Figure 6:
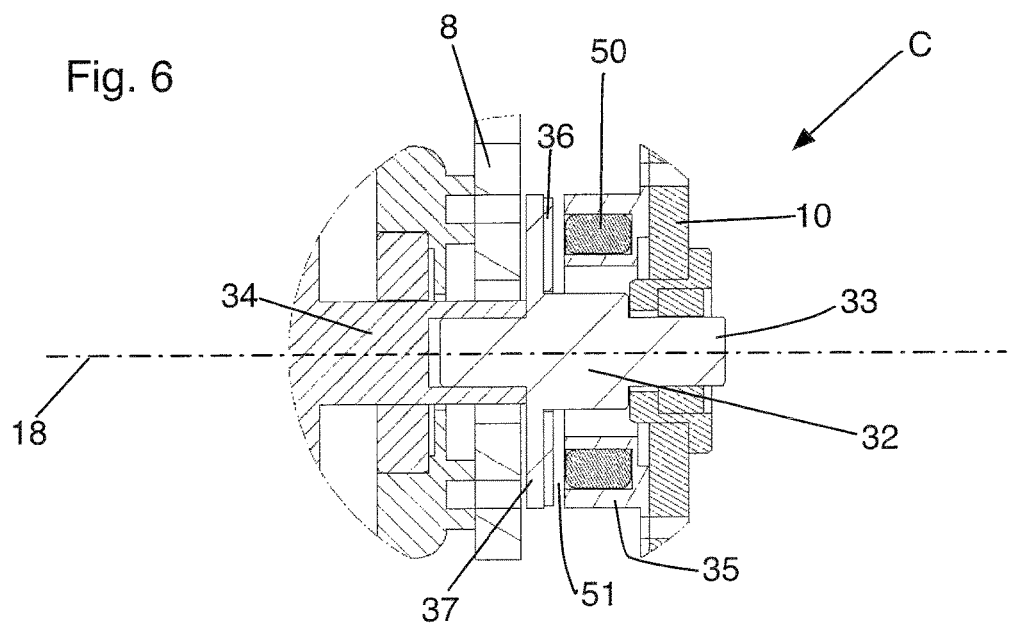
FIG. 6 is a schematic view of a detail of the electromagnetically acting damping and height-adjusting unit from FIG. 5.

According to the alternative embodiment shown in FIGS. 5 and 6, the stator 35 is equipped with a permanent magnet 50. The electromagnetic effect of the electromagnetically acting damping and height-adjusting unit 30 equipped with the permanent magnet 50 that can be achieved is on the one hand also influenced by the rotational speed of the rotor 32. On the other hand, it is however also influenced by a relative axial movement between the rotor 32 and the stator 35 by the rotor 32 being moved axially along the rotational axis 18. In this way, the gap 51 between the rotor 32 and the stator 35 can be changed, as a result of which the interaction between the rotor 32 and the stator 35 can be changed.

In any case, torques acting on the scissors type frame 5 can be generated by the electromagnetically acting damping and height-adjusting unit 30 that is described in each of the embodiments, by means of which torques vibrations of the upper end part 3 can on the one hand be isolated in the vertical direction 21 of the vehicle. On the other hand, the distance between the two end parts 3 and 4 can be individually adjusted in the vertical direction 21 of the vehicle and can be adapted to different loads or the like.

Figure 2:
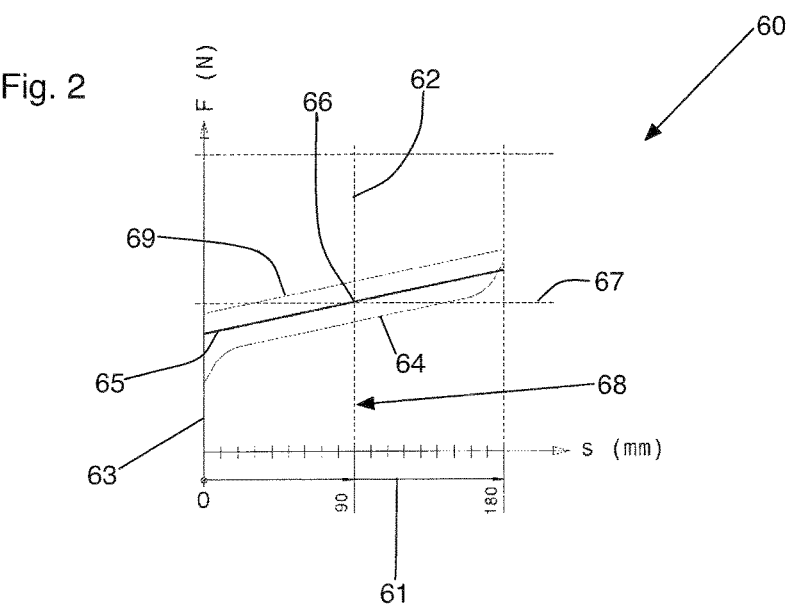

It is also advantageous for a linearly rising force characteristic curve to be provided over the entirety of the available suspension travel, as is also shown by the graph 60 shown in FIG. 2.

In the graph 60, the existing suspension travel s is plotted in millimeters on the abscissa 61, a desired average vertical height level 62 of 90 mm being sought, so that the upper end part 3 can ideally cover both vertically downwardly available negative suspension travel and vertically upwardly available positive suspension travel of 90 mm in each case.

The force F counteracting a load on the upper end part 3 is plotted on the ordinate 63 of the graph 60 in Newtons.

The lower spring characteristic curve 64 plotted on this graph 60 is that of the pneumatic-spring element 20 which progresses logarithmically at the start of the suspension travel s and exponentially at the end of the suspension travel s; in between, the lower spring characteristic curve 64 of the pneumatic-spring element 20 rises linearly.

The characteristic curve 65 extending directly above the lower spring characteristic curve 64 contains the effect of activating the electromagnetically acting damping and height-adjusting unit 30, this force characteristic curve 65 extending both through the point of intersection 66 of the line 67 produced by the load of 1000 N and the line 68 produced by the vertical height level 62, and also extending completely linearly over the entirety of the suspension travel s.

The force characteristic curve 65 shows the target values for the forces generated by the electromagnetically acting damping and height-adjusting unit 30 in the vertical direction 21 of the vehicle.

The upper force characteristic curve 69 describes the forces generated by the electromagnetically acting damping and height-adjusting unit 30 in the vertical direction 21 of the vehicle which are above the target values.

It can be clearly seen from the graph 60 that in particular the pneumatic-spring element 20 serves as a basis for receiving a basic load which acts on the suspension as a mass. In the present case, the suspension device 2 is preloaded with a load minus half the maximum possible spring force. The maximum possible spring force is in particular specified by the dimension of the electromagnetically acting damping and height-adjusting unit 30, which is 200 N in the vertical direction 21 of the vehicle in the graph 60 shown. Therefore, when a load of for example 1000 N is received, the suspension is supported by a pre-load force of 900 N by means of the air suspension element 20. The desired seat height, which is shown on the graph 60 as the desired average vertical height level 62 of 90 mm, is not reached in full by means of the air suspension element 20. However, the electromagnetically acting damping and height-adjusting unit 30 takes on this difference in distance from the desired average vertical height level 62 of 90 mm. The suspension is therefore brought to this target height by means of the force generated by the electromagnetically acting damping and height-adjusting unit 30. In the event of temporary level variations which may occur for example by the drivers weight shifting when driving uphill, downhill or at an angle, depending on the direction and intensity of the variation, the forces generated by the electromagnetically acting damping and height-adjusting unit 30 can be increased or decreased. In the present electromagnetically acting damping and height-adjusting unit 30, the torques or supporting forces respectively generated thereby are utilised to influence external introductions of force that are fed into the suspension system. The electromagnetically acting damping and height-adjusting unit 30 may work with the introduction of force, i.e. a supporting force for carrying the mass is reduced. However, it may also work against the introduction of force, the supporting force being accordingly increased.

In the embodiment, high-frequency control of the electromagnetically acting damping and height-adjusting unit 30, which control is required for influencing vibrations, takes place using the permanent magnet (see FIGS. 5 and 6) by a change of the gap 51 between the rotor 32 and the stator 35, i.e. the axial distance between the rotor 32 and the stator 35 is increased or decreased. Here, a smaller gap 51 generates a greater supporting force acting in the vertical direction 21 of the vehicle than a greater gap 51.

In the embodiment using the electromagnet 40 (see FIGS. 3 and 4), however, the gap 51 remains constant, the control taking place by changing the current strength and/or voltage.

In all embodiments, the type and intensity of the control is taken as a basis in a control algorithm of a correspondingly designed open-loop and/or closed-loop control device (not explicitly shown here).

By means of the open-loop and/or closed-loop control device, the electromagnetically acting damping and height-adjusting unit 30 may be accordingly adjusted depending on a load acting on the upper end part 3.

For this purpose, the open-loop and/or closed loop control device on the one hand comprises an acceleration-measuring sensor (not shown) which is arranged on the face of the lower end part 4 and is intended for detecting accelerations acting on the lower end part 4 and on the other hand comprises a travel-measuring sensor (not shown) for detecting the current distance 31 and/or a corresponding distance variation between the upper and the lower end part 3, 4.

In the embodiments described here, the electromagnetically acting damping and height-adjusting unit 30 is constructed in a structurally simple manner by means of a correspondingly designed eddy current brake 80, and it therefore operates in accordance with the principle of active eddy current control.

It will be understood that the embodiments explained above are only first configurations of the electromagnetically acting damping and height-adjusting unit 30. The configuration of the invention is therefore not limited to these embodiments.

At this point, reference is explicitly therefore once again made to the fact that the above-described vehicle seat substructure 1 may alternatively also be used as a vehicle cab substructure, provided that it is dimensioned accordingly.

All of the features disclosed in the application documents are claimed as being essential to the invention provided that they are novel over the prior art either individually or in combination.

LIST OF REFERENCE NUMERALS 1 vehicle seat substructure
2 suspension device
3 upper end part
4 lower end part
5 scissors type frame
6 first pair of scissor arms
7 second pair of scissor arms
8 first scissor arm of the first pair of scissor arms
9 first scissor arm of the second pair of scissor arms
10 second scissor arm of the first pair of scissor arms
11 second scissor arm of the second pair of scissor arms
12 common lower fixed-bearing device
13 common upper movable-bearing device
14 common upper fixed-bearing device
15 common lower movable-bearing device
16 first pivotal point
17 second pivotal point
18 rotational axis
19 suspension element
20 pneumatic-spring element
21 vertical direction of the vehicle
25 damping device
26 hydraulic shock absorber element
27 cylinder part
28 cross bar
29 piston part
30 damping and height-adjusting unit
31 distance
32 rotor
33 rotational-axis element
34 electrically controllable electric motor
34A housing
35 stator
36 copper ring
37 collar region
40 electromagnets
41 electrical connection
50 permanent magnets
51 gap
60 graph
61 abscissa
62 height level
63 ordinate
64 lower spring characteristic curve
65 force characteristic curve
66 point of intersection
67 line produced
68 further line produced
69 upper force characteristic curve
80 eddy current brake

What is claimed is:

1. A vehicle seat or vehicle cab comprising:
a suspension device including an upper end part and a lower end part that is deflectable relative to the upper end part, which parts are resiliently operatively interconnected by means of a suspension element, and
a damping device for damping vibrations acting on at least one of the two end parts, characterised by an electromagnetically acting damping and height-adjusting unit which is located along a rotational axis that passes through a pivot point of a scissors type frame interconnecting the upper end part and the lower end part, and is arranged between the two end parts such that it acts on the upper of the two end parts in a vertical direction of the vehicle in both a vibration-isolating manner and a height-adjusting manner.

2. The vehicle seat or vehicle cab according to claim 1, wherein the damping device and a height-adjusting device for adjusting a distance between the upper end part and the lower end part in the vertical direction of the vehicle together comprise the electromagnetically acting damping and height-adjusting unit, by means of which a torque acting in the vertical direction of the vehicle can be generated.

3. The vehicle seat or vehicle cab according to claim 1, wherein a rotor of the electromagnetically acting damping and height-adjusting unit comprises a rotational-axis element of two rotationally interconnected scissor arm parts of the scissors type frame coupling the two end parts to one another.

4. The vehicle seat or vehicle cab according to claim 1, wherein a drive unit of a rotor of the electromagnetically acting damping and height-adjusting unit is arranged on a first scissor arm part of the scissors type frame coupling the two end parts to one another and a stator of the electromagnetically acting damping and height-adjusting unit is arranged on a second scissor arm part of the scissors type frame.

5. The vehicle seat or vehicle cab according to claim 4, wherein the stator comprises an electrically controllable electromagnet element or a permanent-magnet element.

6. The vehicle seat or vehicle cab according to claim 3, wherein the rotor is mounted relative to a stator such that it can move axially along a rotational axis of the rotational-axis element.

7. The vehicle seat or vehicle cab according to claim 1, characterised by an open-loop and/or closed-loop control device for adjusting the electromagnetically acting damping and height-adjusting unit depending on a load acting on the upper end part.

8. The vehicle seat or vehicle cab according to claim 7, characterised by the open-loop and/or closed-loop control device comprising an acceleration-measuring sensor which is arranged on the face of the lower end part and is intended for detecting accelerations acting on the lower end part.

9. The vehicle seat or vehicle cab according to claim 7, wherein the open-loop and/or closed-loop control device comprises a travel-measuring sensor for detecting a distance and/or a distance variation between the upper and the lower end part.

10. The vehicle seat or vehicle cab according to claim 1, wherein the electromagnetically acting damping and height-adjusting unit comprises an eddy current brake.

11. The vehicle seat or vehicle cab according to claim 1, wherein the scissors type frame comprises a first pair scissor arm parts and a second pair of scissor arm parts, wherein each pair of scissor arm parts are made up of first and second scissor arm parts which are rotationally interconnected at the pivot point in the center of a longitudinal extension of the scissor arm parts.

12. The vehicle seat or vehicle cab according to claim 11, wherein the electromagnetically acting damping and height-adjusting unit is arranged between the first pair of scissor arm parts and the second pair of scissor arm parts.

13. The vehicle seat or vehicle cab according to claim 1, wherein the electromagnetically acting damping and height-adjusting unit comprises a pole friction clutch.

14. The vehicle seat or vehicle cab according to claim 1, wherein the suspension device further comprises a suspension element by means of which the upper end part and the lower end part are resiliently interconnected.

15. The vehicle seat or vehicle cab according to claim 11, wherein the damping device comprises a hydraulic shock absorber element which is attached to a cross bar of a common lower movable-bearing device which connects second scissor arm parts.

16. The vehicle seat or vehicle cab according to claim 4, wherein an electromagnetic effect of the electromagnetically acting damping and height-adjusting element is influenced by a relative axial movement between the rotor and the stator by the rotor being moved axially along the rotational axis.

17. The vehicle seat of vehicle cab according to claim 4, wherein the rotor rotates relative to the stator, and the rotor rotates about the rotational axis that passes through the pivot point of the scissors type frame.

\* \* \* \* \*